(12) United States Patent
Thalanany et al.

(10) Patent No.: US 10,043,385 B2
(45) Date of Patent: Aug. 7, 2018

(54) CONFIGURING TRAFFIC CONTROL DEVICE SWITCH TIMING INTERVALS USING MOBILE WIRELESS DEVICE-PROVIDED TRAFFIC INFORMATION

(71) Applicant: United States Cellular Corporation, Chicago, IL (US)

(72) Inventors: Sebastian Thalanany, Kildeer, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 15/174,635

(22) Filed: Jun. 6, 2016

(65) Prior Publication Data
US 2017/0352264 A1   Dec. 7, 2017

(51) Int. Cl.
| | |
|---|---|
| *G06F 19/00* | (2018.01) |
| *G06G 7/70* | (2006.01) |
| *G06G 7/76* | (2006.01) |
| *G08G 1/00* | (2006.01) |
| *G08G 1/01* | (2006.01) |
| *H04W 8/18* | (2009.01) |
| *H04W 4/029* | (2018.01) |

(52) U.S. Cl.
CPC ......... *G08G 1/0145* (2013.01); *G08G 1/0125* (2013.01); *H04W 4/029* (2018.02); *H04W 8/18* (2013.01); *H04M 2250/10* (2013.01)

(58) Field of Classification Search
CPC ... G08G 1/0145; G08G 1/0125; H04W 4/028; H04W 8/18; H04M 2250/10
See application file for complete search history.

(56) References Cited

U.S. PATENT DOCUMENTS

| | | | | |
|---|---|---|---|---|
| 6,124,807 | A * | 9/2000 | Heckeroth | G08G 1/07 340/908 |
| 7,417,560 | B2 * | 8/2008 | Schwartz | G08G 1/0965 340/906 |
| 7,432,826 | B2 * | 10/2008 | Schwartz | G08G 1/081 340/902 |

(Continued)

*Primary Examiner* — Anne M Antonucci
*Assistant Examiner* — Kenny A. Taveras
(74) *Attorney, Agent, or Firm* — Leydig, Voit & Mayer, Ltd.

(57) ABSTRACT

A traffic control device (TCD) is described for managing control of multiple right of way passages at a traffic intersection. The TCD includes a mobile wireless interface for communicating with an in-vehicle mobile wireless device (IV-MWD) to receive a commuter profile (CP) containing a subscribed switch time interval (SSTI). The TCD determines a set of passage priority values for respective ones of a set of controlled right of way passages. The TCD selects, based upon the set of passage priority values, a highest priority one of the set of controlled right of way passages as a next controlled right of way passage granted passage. The TCD resets a timer duration value associated with a next controlled right of way passage period, executes a right of way passage switch. Thereafter, the TCD maintains a current switch status of the traffic control device for a period corresponding to the timer duration value.

27 Claims, 6 Drawing Sheets

(56) References Cited

U.S. PATENT DOCUMENTS

| | | | | |
|---|---|---|---|---|
| 7,515,064 B2* | 4/2009 | Schwartz | G08G 1/087 | 340/902 |
| 7,573,399 B2* | 8/2009 | Schwartz | G08G 1/087 | 340/906 |
| 8,253,592 B1* | 8/2012 | Chandra | G08G 1/081 | 340/907 |
| 8,487,780 B2* | 7/2013 | Edwardson | G08G 1/087 | 340/902 |
| 8,773,282 B2* | 7/2014 | Cross | G08G 1/087 | 340/906 |
| 8,830,085 B2* | 9/2014 | Edwardson | G08G 1/087 | 340/902 |
| 8,878,695 B2* | 11/2014 | Cross | G08G 1/087 | 340/901 |
| 9,330,566 B2* | 5/2016 | Cross | G08G 1/087 | |
| 9,381,916 B1* | 7/2016 | Zhu | B60W 30/0956 | |
| 9,412,271 B2* | 8/2016 | Sharma | G08G 1/052 | |
| 9,495,874 B1* | 11/2016 | Zhu | G06N 3/00 | |
| 2003/0006909 A1* | 1/2003 | Basson | G08G 1/087 | 340/906 |
| 2004/0119612 A1* | 6/2004 | Chen | G08G 1/0104 | 340/995.13 |
| 2006/0265294 A1* | 11/2006 | de Sylva | G06Q 30/0603 | 705/28 |
| 2007/0290839 A1* | 12/2007 | Uyeki | G01C 21/3415 | 340/539.13 |
| 2008/0218380 A1* | 9/2008 | Wall | G08G 1/081 | 340/907 |
| 2009/0125160 A1* | 5/2009 | Desai | B60N 2/01 | 701/1 |
| 2012/0326890 A1* | 12/2012 | Cross | G08G 1/087 | 340/906 |
| 2013/0135118 A1* | 5/2013 | Ricci | G06F 9/54 | 340/932.2 |
| 2013/0151088 A1* | 6/2013 | Ricci | G06F 17/00 | 701/51 |
| 2014/0081483 A1* | 3/2014 | Weinmann | G08G 5/0021 | 701/14 |
| 2015/0287319 A1* | 10/2015 | Cama | G08G 1/07 | 701/117 |
| 2016/0189544 A1* | 6/2016 | Ricci | G07C 5/008 | 701/117 |
| 2016/0210852 A1* | 7/2016 | Buchholz | G08G 1/0112 | |

* cited by examiner

CONFIGURING TRAFFIC CONTROL DEVICE SWITCH TIMING INTERVALS USING MOBILE WIRELESS DEVICE-PROVIDED TRAFFIC INFORMATION

FIELD OF THE INVENTION

This invention relates generally to the combined fields of mobile wireless communications networks and electronic traffic control systems (e.g. stop lights). More particularly, the invention is directed to networked traffic control systems including programmable logic configured to adjust time durations in response to live commands generated by control logic responsive to sensed traffic congestion.

BACKGROUND OF THE INVENTION

Presently, to the extent that traffic control devices (e.g. stop lights) rely upon sensed vehicles to govern the state of traffic control signals, they are limited to sensing a vehicle passing within a detection range of a magnetic sensor. Thus, a single car approaching a red light in an intersection may instantaneously disrupt the flow of a long line of vehicles currently passing through the intersection in the green light. Many would consider fundamentally unreasonable that a single vehicle approaching a traffic device-controlled intersection can instantly disrupt flow of a large number of vehicles currently having a right of way through the controlled intersection. Especially if the large number of vehicles endured several minutes in heavy traffic to merely approach the intersection.

Proliferation of smart phones, and their use to perform an ever-increasing number of applications, has resulted in substantial increases in the percentage of vehicles having at least one occupant connected to, and communicating with, mobile wireless network infrastructure (e.g., cell towers, small cells, femto cells, etc.). It stands to reason that use of mobile wireless devices may even increase as vehicle traffic congestion rises due to users consulting a variety of traffic route segment congestion reporting and alternative route determination aids. Whenever such devices connect to, and communicate with, the mobile wireless network infrastructure, a potential to determine a current location of such communicating devices exists.

For example, highways and streets in urban and suburban regions exhibit high in-vehicle smart phone utilization during routine workday commuting intervals. It is possible to identify the geospatial location of each mobile wireless device user with a relatively high degree of precision (i.e., within several feet) while the users are traveling in a moving vehicle, of relative geospatial position coherence among vehicles traveling in a same direction, especially in heavy road traffic conditions wherein the vehicles likely travel at slow absolute speed.

SUMMARY OF THE INVENTION

Embodiments of the invention are used to provide a system and method for managing traffic at a traffic intersection. More particularly, a traffic control device (TCD) node is described herein for managing control of multiple right of way passages at an intersection under control of the TCD. The TCD node includes a mobile wireless interface for communicating with an in-vehicle mobile wireless device (IV-MWD) to receive a commuter profile (CP) containing a subscribed switch time interval (SSTI), a processor, and a non-transitory computer-readable medium.

The non-transitory computer-readable medium is configured to store right of way passage-specific CP sets and to store computer-executable instructions that, when executed by the processor, facilitate performing, by the TCD, a method that includes determining a set of passage priority values for respective ones of a set of controlled right of way passages, where each one of the set of passage priority values is based upon SSTI values for IV-MWDs currently waiting to pass through a same respective one of the set of controlled right of way passages. The method further includes selecting, based upon the set of passage priority values, a highest priority one of the set of controlled right of way passages as a next controlled right of way passage granted passage. The method performed by the TCD also includes resetting a timer duration value associated with a next controlled right of way passage period. The TCD executes a right of way passage switch in accordance with the selecting. Thereafter, the TCD maintains a current switch status of the traffic control device for a period corresponding to the timer duration value.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
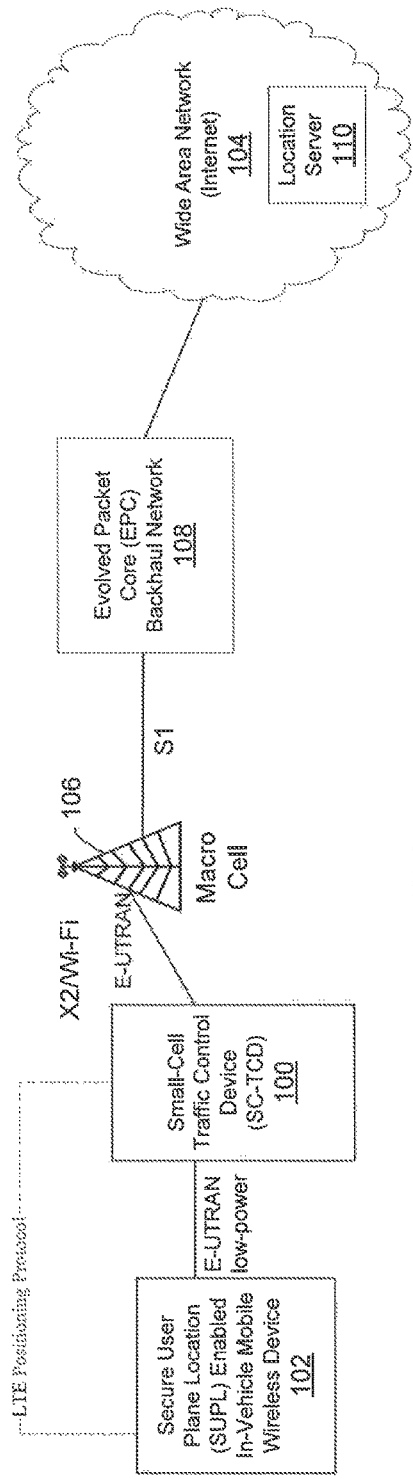
FIG. 1 is a schematic diagram illustrating a mobile wireless network environment interfacing, via small cell gateways, a broadband digital data network through which a mobile wireless device interfaces to a small-cell traffic control device (e.g. traffic light) in accordance with embodiments of the invention.

The figures and associated written description provide illustrative examples of a system and method for supporting and carrying out a traffic control device having a traffic flow control operating mode that is enabled/informed by detection of secure user plane location (SUPL) enabled mobile wireless devices within vehicles in the vicinity of the traffic control device. SUPL functionality is facilitated by processes executed by access points that exploit network resources to obtain location information. Detection of such mobile wireless devices is enabled by communications via a small cell (SC) co-located with the traffic control device. In particular, the traffic control device includes an SC, through which in-range mobile wireless devices communicate with the traffic control device (including an associated programmed controller) to inform the traffic control device of relative numbers of vehicles (in each approach direction) waiting to pass through the traffic control device-managed intersection. The traffic control device applies a set of rules for governing traffic flow through the intersection to the detected populations of mobile wireless devices in relatively close proximity of the traffic control device. Thus, the traffic flow control system and method described herein facilitates better traffic flow-control decisions (based upon total vehicles waiting in various directions) than decisions provided by known traffic control systems that rely upon magnetic relays to detect the presence of a single vehicle in a particular intersection lane.

Traffic light switching is typically enforced through statically defined time intervals and/or electro-mechanical (inductive loop) triggers embedded in the lanes approaching the intersection that are tripped when a vehicle of sufficient ferroelectric material mass passes over a portion of a road containing the triggering mechanism. Traffic backups created by inequitable static timing distribution, between competing directions of vehicular traffic flow through a traffic light mediated intersection, are a root cause of driver frustration and impair the driving experience.

When vehicular traffic flow density variations are random, the impairments to the commuting experience (i.e., driver frustration) are likely to be severe. In the presence of highly variable, potentially very heavy, random vehicular traffic flow densities, the variations in the densities over the course of the day prevent using aforementioned static timing patterns (supplemented by asynchronous triggering coupled to electro-mechanical sensor signaling). The known systems are incapable of consistently fairly allocating flow permissions through intersections experiencing widely varying flow densities.

Typical traffic light switching is governed by statically defined interval timers and/or asynchronous event triggers based on arrival of a vehicle at an intersection (i.e. the vehicle passing over an inductive loop embedded within the road. Such semi-static traffic light switching behavior does not effectively or efficiently utilize and allocate the road resources to maximize throughput and minimize travel delays at a particular intersection in the presence of unpredictable, highly variable, traffic flows.

In illustrative examples provided herein, the SC integrated with a traffic control device (e.g. stop light) for an intersection utilizes signaling with mobile wireless devices within on-coming traffic at the intersection to facilitate determining a current waiting pattern based upon quantity and wait times associated with vehicles approaching the intersection. The traffic control device includes a switch time duration determination function that is applied to the currently detected traffic waiting pattern for the intersection. The illustrative examples described herein provide a framework for improving overall driver experience by taking into consideration current vehicle populations at each direction of approach to the traffic control device.

Turning to FIG. 1, a schematic diagram depicts physical/structural components of an illustrative embodiment of the invention carried out in an exemplary (e.g., LTE or Long Term Evolution) mobile wireless data network environment. The environment depicted in FIG. 1 is substantially simplified, as one skilled in the art would readily observe, to focus upon a small-cell traffic control device (SC-TCD) 100 and networked components facilitating sensing approaching secure user plane location (SUPL) enabled vehicular traffic. The SC-TCD 100 executes a SUPL location platform (SLP) process. By way of example, the SLP comprises a SUPL Location Center (SLC) and a SUPL Positioning Center (SPC). The SLC performs the coordination and administrative functions to facilitate location services. The SPC performs the spatial positioning functioning.

The SLP process renders traffic management decisions regarding control of traffic flow along intersecting paths at an intersection, controlled by the SC-TCD 100, based upon: (1) local vehicle congestion information, and (2) regional congestion information rendered by neighboring SC-TCDs. By way of example, the SC-TCD 100 executes a switching time procedure (STP) that renders traffic management parameter values, including switching time intervals (STIs) for the various traffic flows (e.g., left turn lane, through lane, etc.) controlled by the SC-TCD 100. The STIs for the SC-TCD 100 are time-filtered to render a set of long-term switching time intervals (one for each of supported traffic control states) at the particular intersection served by the SC-TCD 100.

The SC-TCD 100 acquires the local traffic information based upon signaling and communicated information provided by SUPL enabled terminals (SETs)—e.g. appropriately configured mobile wireless devices (MWDs) such as an in-vehicle mobile wireless device 102 (IV-MWD) approaching the SC-TCD 100. In the illustrative example, the IV-MWD 102 communicates with the SC-TCD 100 using evolved UMTS Terrestrial Radio Access Network (E-UTRAN) air interface specified by the Third-Generation Partnership Project (3GPP) LTE radio interface specification for mobile wireless communications. However, the IV-MWD 102 may potentially use WiFi (e.g. 802-11), licensed spectrum, or unlicensed spectrum based air interfaces.

The IV-MWD 102 is generally a smart mobile wireless device that may be, for example any of the following: a mobile phone, a personal digital assistant ("PDA"), a mobile computer (e.g., a laptop, notebook, notepad or tablet), etc. having mobile wireless data network interface capability. The IV-MWD 102 may be installed within the vehicle itself (integrated with a telematics/navigation/infotainment unit) or carried by any occupant of a vehicle approaching the SC-TCD 100. The IV-MWD 102 is configured with a mobile wireless communications-based application enabling the IV-MWD 102 to communicate location information, among other things, to the SC-TCD 100 after the IV-MWD 102 has entered the effective range of the SC-TCD 100. By way of example, the IV-MWD 102 is configured with a Secure User Plane Location (SUPL) process for accessing location information, via use of network resources, which permits independence from whether the location method is control or user plane oriented.

The SC-TCD 100, in turn, supports air communications with a macrocell 106 that is, for example, a Long Term Evolution (LTE) EnodeB Macro Cell. By way of example, the SC-TCD 100 supports an E-UTRAN interface with the macrocell 106. In accordance examples described herein, the SC-TCD 100 includes a processor and a computer-readable medium (e.g. a non-transitory computer-readable medium) including computer-executable instructions for carrying out traffic control operations described herein with reference to FIGS. 7 and 8.

The macrocell 106 (EnodeB macrocell), in accordance with the 3GPP specification, support an S1 interface connection with corresponding packet switched core backhaul networks that are maintained, for example, by distinct mobile wireless data network service providers. Thus, in the exemplary multi-provider scenario, the macrocell 106 connects via an S1 interface connection to an Evolved Packet Core (EPC) backhaul network 108. The EPC backhaul network 108 is communicatively coupled to a wide area network (WAN) 104, such as the Internet. The WAN 104 includes multiple resources, including a location server 110. The location server 110 executes a Home-SUPL Location Platform (H-SLP) associated with, for example, a geographic service area served by the macrocell 106.

The illustrative mobile wireless data network infrastructure/environment depicted in FIG. 1 is not intended to limit the invention with regard to alternative network topologies. Rather, it is intended to provide a visualization of a network architecture supporting discovery and, thereafter, cooperation between IV-MWD (e.g. IV-MWD 102) and SC-TCDs (e.g. SC-TCD 100) to facilitate real-time on-coming vehicle sensing that is used by the SC-TCDs to alter, in the short-term, traffic light timing to ensure efficient passage of traffic through an intersection in accordance with a traffic timing criterion.

Moreover, by using a low-power signal for the connection between the IV-MWD 102 and the SC-TCD 100 within a same generally limited range (e.g., about a quarter mile, or less), the frequency spectrum for the connection between these two wireless communication component/node types can be re-used, substantially, on a per-traffic-controlled-intersection basis—or alternating intersection in high density traffic control areas such as in urban areas—with minimal interference with neighboring SC-TCDs at other intersections.

In the illustrative examples, the SC-TCD 100 has a limited communication range (less than a quarter mile), and therefore the IV-MWD 102 must be within the limited communication range of the SC-TCD 100 to initiate communications relating to the traffic control functionality described herein. Once connected and registered by the SC-TCD 100, the SUPL enabled IV-MWD 102 conveys information to the SC-TCD 100 via a commuter profile (CP) message using an LTE positioning protocol (LPP). The LPP facilitates exchanging location related information, at the Application Layer, over mobile connectivity to exchange, capabilities, positioning, or positioning assistance information between the mobile device and the serving network. Single or multiple LPP sessions are used to orchestrate the exchange of location relation information. Each of the LPP sessions, potentially consists of one or more LPP information transactions associated with an exchange of location related capabilities, triggers, assistance, auxiliary data etc. in addition to location related measurements and estimates. An LPP session may be initiated by either the IV-MWD or the SC-TCD, and may occur in a parallel or in a serial manner. LPP utilizes a transaction ID to link the request and response LPP messages that are associated within the same LPP transaction.

During communication of CP information, secure user plane IP tunnels are utilized. The SUPL protocol is, by way of example, an application layer protocol operating over an interface between the SLP (SUPL Location Platform) in the network and the SET (SUPL Enabled Terminal)—e.g., the IV-MWD 102 in the form of a mobile device (Smartphone, Tablet etc.). The SUPL technology features: broad applicability, universal IP oriented connectivity, support for existing and future protocols, and support for generalized location related information processing. Consequently, SUPL permits control plane oriented location protocols for exchanging location information between IV-MWDs and network nodes (e.g. SC-TCDs).

As such, the SC-TCD 100 operates as a highly configurable traffic controller capable of re-configuring timing of signal switching in accordance with traffic density and other factors relating to oncoming traffic at the intersection served by the SC-TCD 100.

Figure 2:
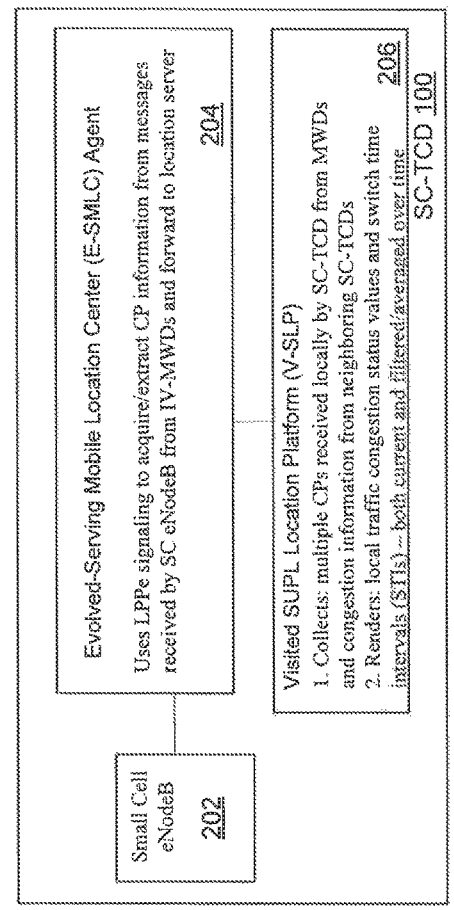
FIG. 2 is a schematic diagram identifying components incorporated within the small cell traffic control device (SC-TCD) for modifying switching time intervals (STIs) in response to detected oncoming vehicle traffic at an intersection for which the SC-TCD manages traffic flow.

Turning to FIG. 2, a detailed view of the SC-TCD 100 is provided. In an exemplary embodiment, the SC-TCD 100 includes a small cell eNodeB 202. The SC eNodeB 202 carries out communications with IV-MWDs using, for example, the E-UTRAN interface. However, additional short-range air interfaces are also contemplated and supported for the SC-TCD 100 communications relating to CP's associated with IV-MWDs approaching the intersection served by the SC-TCD 100.

The SC-TCD 100 further includes, by way of example, an evolved-Serving Mobile Location Center (E-SMLC) Agent 204. The E-SMLC agent 204 uses LTE positioning protocol (LPP) signaling to acquire the CP information from the IV-MWDs of oncoming vehicular traffic for an intersection served by the SC-TCD 100. The E-SMLC agent 204 within the SC-TCD 100 collects the CP information, via LTE Positioning Protocol extensions (LPPe) within LPP messaging.

The LPPe message structure, by way of example, includes an External Protocol Data Unit (EPDU), which is a well-defined information container that can be leveraged, for the transfer of a user-specific CP to the SC-TCD. The contents of the CP from an IV-MWD are encapsulated in an EPDU, using, by way of example, the ASN.1 syntax, with a "Need ON"-optionally present qualifier. An LPPe Information Element (IE) containing the CP is transferred to the SC-TCD, within an LPPe capabilities response message. Notably, if the LPPe capabilities response message is received by the SC-TCD, and the CP IE is absent, then the SC-TCD creates a CP entry including an STI equal to a default (e.g. average) value for the STI.

A Visited-SUPL Location Platform (V-SLP) 206 performs operations for rendering STIs used to specify switching times for the SC-TCD 100. The V-SLP 206 executes an SLP process to render a set of STIs for defining traffic flow via interfering paths at an intersection served by the SC-TCD 100. By way of example, values for the set of STIs are based upon: (1) local vehicle congestion information rendered from received CPs provided by in-range IV-MWDs (acquired by the E-SMLC agent 204 via the SC eNodeB 202), and (2) regional congestion information acquired by neighboring SC-TCDs and provided via the location server 110.

By way of example, the V-SLP 206 executes a switching time procedure (STP), based upon a potentially wide variety of information and computational formulas, to render values for the STIs for the various traffic flows (e.g., left turn lane, right turn arrow, through lane, etc.) controlled by the SC-TCD 100. The V-SLP 206 generates local traffic congestion parameter values based upon CPs acquired by the E-SMLC agent 204 via the SC eNodeB 202. Additionally, the computation of STIs may take into consideration other SC-TCD status information. Thus, for example, the V-SLP 206 generates STIs for the SC-TCD 100 based upon the locally rendered traffic congestion parameter values (for the intersection served by the SC-TCD 100) and congestion parameter values for other TCDs in the same region (e.g. neighboring TCDs) provided by the location server 110. Operation of the V-SLP 206 is described herein below with reference to FIGS. 6, 7, and 8.

Additionally, discrete value filtering may be incorporated into calculations of the V-SLP 206 to provide a certain degree of stability to STI values in a specifiable short term while permitting substantial changes over a longer (specifiable) time period. Thus, by way of example, the V-SLP 206 applies a time-based filter to a series of previously calculated and current STI value sets to render a set of relatively long-term switching time intervals (one for each of supported traffic control states) at the particular intersection served by the SC-TCD 100. Thus, the V-SLP 206 renders traffic control timing decisions based upon both temporally (time) and geographically spaced traffic flow information. The V-SLP 206 utilizes resulting location-oriented and dynamically changing overall traffic congestion conditions for further processing that renders: (1) local traffic control status parameter values (used locally and communicated to the location server 101 to aid regional traffic congestion-based traffic control decisions), and (2) traffic control switch timing.

Additionally, in a context of traffic routing, in operation, the IV-MWD 102 conveys CP information to the SC-TCD 100 after the SC-TCD 100 is encountered by the IV-MWD 102 in a trip session. Thereafter, the SC-TCD 100 conveys the received CP information to the location server 110 executing the H-SLP application to render regional traffic control information over, for example, a geographic service area served by the macrocell 106.

The H-SLP application, with its global awareness of dynamic traffic conditions (based upon the collective SC-TCD information for a region spanning multiple intersections over several square miles), may update the CP of the IV-MWD 102 for further communication back to the IV-MWD 102 via either the SC-TCD 100 or some other TCD incorporated into a network of TCDs served by the location server 110. The returned CP may specify a routing preference indicating a suggested route in view of sensed traffic congestion/throughput conditions at multiple controlled intersections (served by TCDs) in the vicinity of the SC-TCD 100 that sensed the IV-MWD 102.

Figure 3:
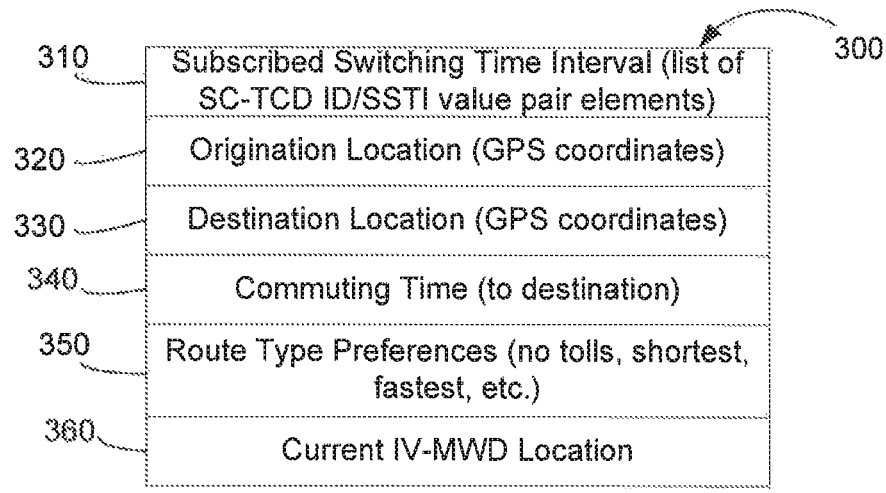
FIG. 3 summarizes a set of fields of an exemplary commuter profile (CP) conveying information from an in-vehicle mobile wireless device (IV-MWD) to a small cell traffic control device (SC-TCD)

Turning to FIG. 3, detailed fields are enumerated for an exemplary commuter profile (CP) structure 300 utilized by the system described herein above with reference to FIGS. 1 and 2.

A subscribed switching time interval (SSTI) 310 comprises a configurable list of SC-TCD ID/SSTI value pair elements corresponding to SC-TCDs on a contemplated route to be taken by the IV-MWD. Each one of the enumerated SSTI list value pair elements includes: (1) an SC-TCD identification, and (2) a corresponding SSTI duration value. The SSTI duration value is indicative of a "contracted" target maximum time duration that an SC-TCD will maintain a "red" state while the IV-MWD 102 waits at an intersection under control of the SC-TCD. The SSTI duration value can be presented in a variety of ways. For example, the SSTI duration value may be a relative value (e.g. percentage of total control cycle). The SSTI duration value may also be presented as an absolute value (e.g. 90 time units). A SC-TCD, upon receiving a CP from a particular IV-MWD, is not bound to honor the SSTI duration value since multiple IV-MWD's are often present at a particular intersection controlled by an SC-TCD at any particular point in time. However, the SSTI will be a factor in the SC-TCD's computation of a wait time associated with a redlight/stopped state for the particular IV-MWD. See FIG. 7 described herein below.

The assignment of particular values to SSTIs for particular IV-MWDs is subject to a wide range of variations having a vast range of complexities. By way of example, a distance based formula is used to assign SSTI values to an IV-MWD based on current trip duration. Thus, an initially high SSTI value is assigned for provision to SC-TCDs encountered at the beginning of a trip. However, as the total trip time increases, the SSTI issued to the IV-MWD decreases according to a trip duration/distance traveled (even accumulated wait time) formula.

The SC-TCD identification may be represented in a variety of ways. For example, the identification may indicate and correspond to an individual SC-TCD. Additionally, the identification may indicate and correspond to an SC-TCD class/group. Thus, when the IV-MWD 102 approaches a particular SC-TCD determined to be on-route to the IV-MWD's destination, the IV-MWD 102 provides a CP message including an SSTI value corresponding to the particular SC-TCD or class/group to which the particular SC-TCD belongs.

An origination location 320 specifies geospatial coordinates for the point of origination of the IV-MWD 102 on a current trip.

A destination location 330 specifies geospatial coordinates for the point of completion of the IV-MWD 102 on the current trip.

A commuting time 340 specifies an estimated time duration from the current location of the IV-MWD 102 to the point of completion, specified in the destination location 330, on the current trip. The estimated time duration may be provided by a third party navigation service based upon real-time congestion information along an intended/recommended route from the current location of the IV-MWD 102 to the specified destination location.

A routing preference 350 specifies a type of route requested for completing the trip—local roads, no tolls, fastest route, etc.

A current location 360 specifies relatively high precision location (at least a granularity enabling determination of a particular lane of travel) of the IV-MWD 102.

Figure 4:
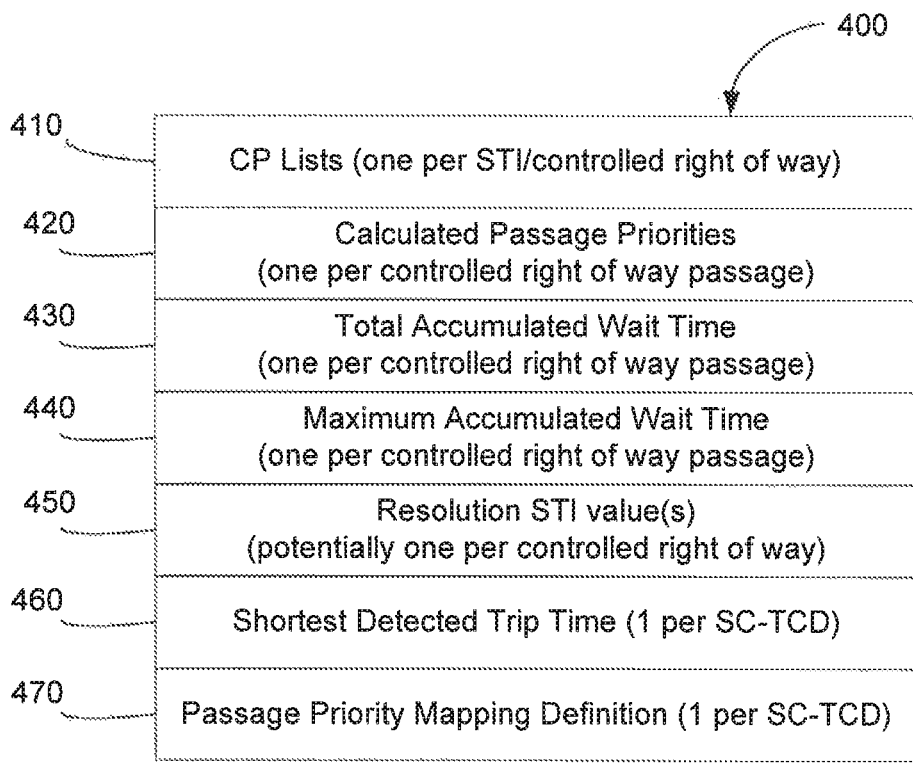
FIG. 4 summarizes a set of stored information fields maintained at the SC-TCD to facilitate STI determinations in response to detected oncoming traffic levels.

Turning to FIG. 4, a set of data types are identified that are maintained by the SC-TCD 100. A CP lists 410 stores references (e.g., pointers, table identifiers) for a set CP structures currently stored on the SC-TCD 100 corresponding to CP messages received by the SC-TCD 100 from approaching IV-MWDs. A separate CP list is maintained for each controlled right of way passage for the SC-TCD 100. A calculated passage priorities 420 stores a set of calculated passage priorities. In an illustrative example, the length of time of a next green cycle is based, at least in part, upon the passage priority of a right of way passage that will be waiting during a next green light cycle for a right of way passage having a highest current passage priority. A separate passage priority value placeholder is maintained for each controlled right of way passage for the SC-TCD 100. See FIG. 7, item 710 described below.

By way of example, the SC-TCD includes a set of data structures associated with preventing extended wait periods for low priority right of way passages. To ensure each right of way passage is eventually given green light status, fields are provided to specify maximum accumulated wait time before an over-ride logic takes over to give passage to a right of way that would not have been selected based upon calculated passage priorities 420 alone. A total accumulated wait time 430 stores a set of counter values representing total time elapsed since a particular controlled right of way passage was in a "green light" state. A separate total accumulated wait time value placeholder is maintained for each controlled right of way passage for the SC-TCD. By way of example, a current value of the total accumulated wait time is applied to a right of way selection scheme carried out by the SC-TCD 100 to enforce/ensure that no IV-MWD is held indefinitely in a right of way in a red light state. For example, the SC-TCD may implement a right of way selection scheme where a controlled right of way passage is automatically selected to switch to a green state, during a next traffic control device right of way switch of the SC-TCD, when the total accumulated wait time reaches a prescribed maximum wait value (e.g., 300 seconds) stored in a maximum accumulated wait times 440. A single maximum accumulated wait time can be used for all controlled right of ways for the SC-TCD 100. However, in the illustrative example, a set of placeholders is maintained to hold a right of way-specific maximum accumulated wait time for a corresponding controlled right of way passage for the SC-TCD 100.

A resolution STI value(s) 450 stores one or more time durations that will be used to set a green light countdown timer during the green light cycle where the standard passage priority-based right of way selection is overridden by a selection that is based upon total accumulated wait time by a right of way since a last green light (e.g., a particular right of way has not been assigned green light status for 5 minutes).

A shortest detected trip time 460 stores a current shortest trip duration of all IV-MWDs approaching the SC-TCD. Thus, only a single value for the shortest detected trip time 460 (for all controlled right of way passages) is maintained by the SC-TCD. The shortest detected trip time 460 is used to calculate weight factors for all currently approaching IV-MWDs in accordance with Equation (2) discussed below with reference to FIG. 7 (step 710).

A passage priority mapping definition 470 specifies a relationship between a specified passage priority-based value (e.g. second highest passage priority, ratio of first/second highest passage priority, difference first/second highest passage priority, etc.) an a corresponding time period assigned to the countdown clock for the next green light period (or other passage control period) for the currently selected right of way passage under control of the SC-TCD. For example, the set of inputs can range from zero to a maximum passage-priority based value and the set of outputs values specify range for a green light period (in seconds) from a maximum period (second highest passage priority value is significantly lower than the highest passage priority value) to a shortest period (the second highest passage priority is relatively high and close to the highest passage priority).

Figure 5A:
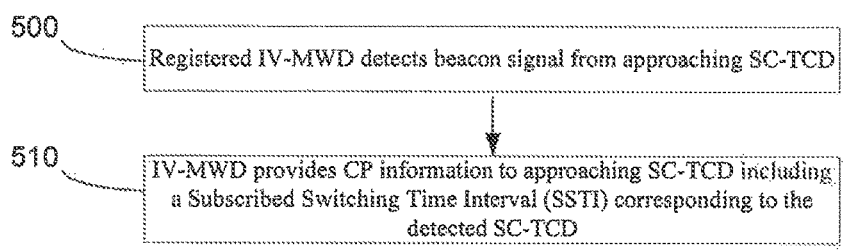
FIG. 5A summarizes operation of an IV-MWD to acquire and provide a CP for consumption/processing by an SC-TCD.
Figure 5B:
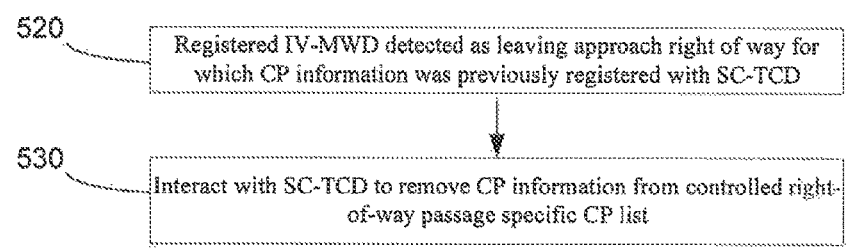
FIG. 5B summarizes operation of an IV-MWD to request removal of a CP from CP list on a SC-TCD.
Figure 6:
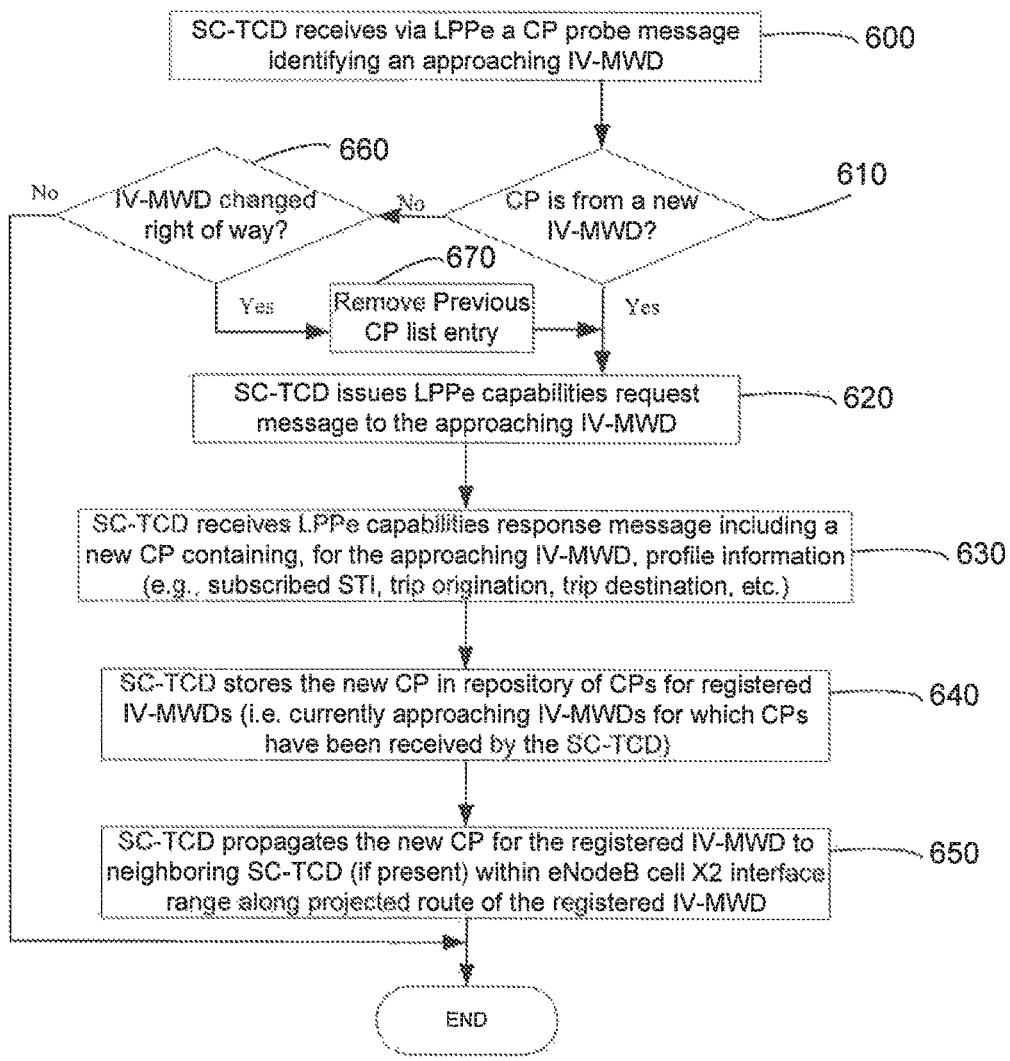
FIG. 6 is a flowchart summarizing operation of a SC-TCD to maintain CP lists corresponding to IV-MWDs waiting at right of way passages controlled by the SC-TCD.
Figure 7:
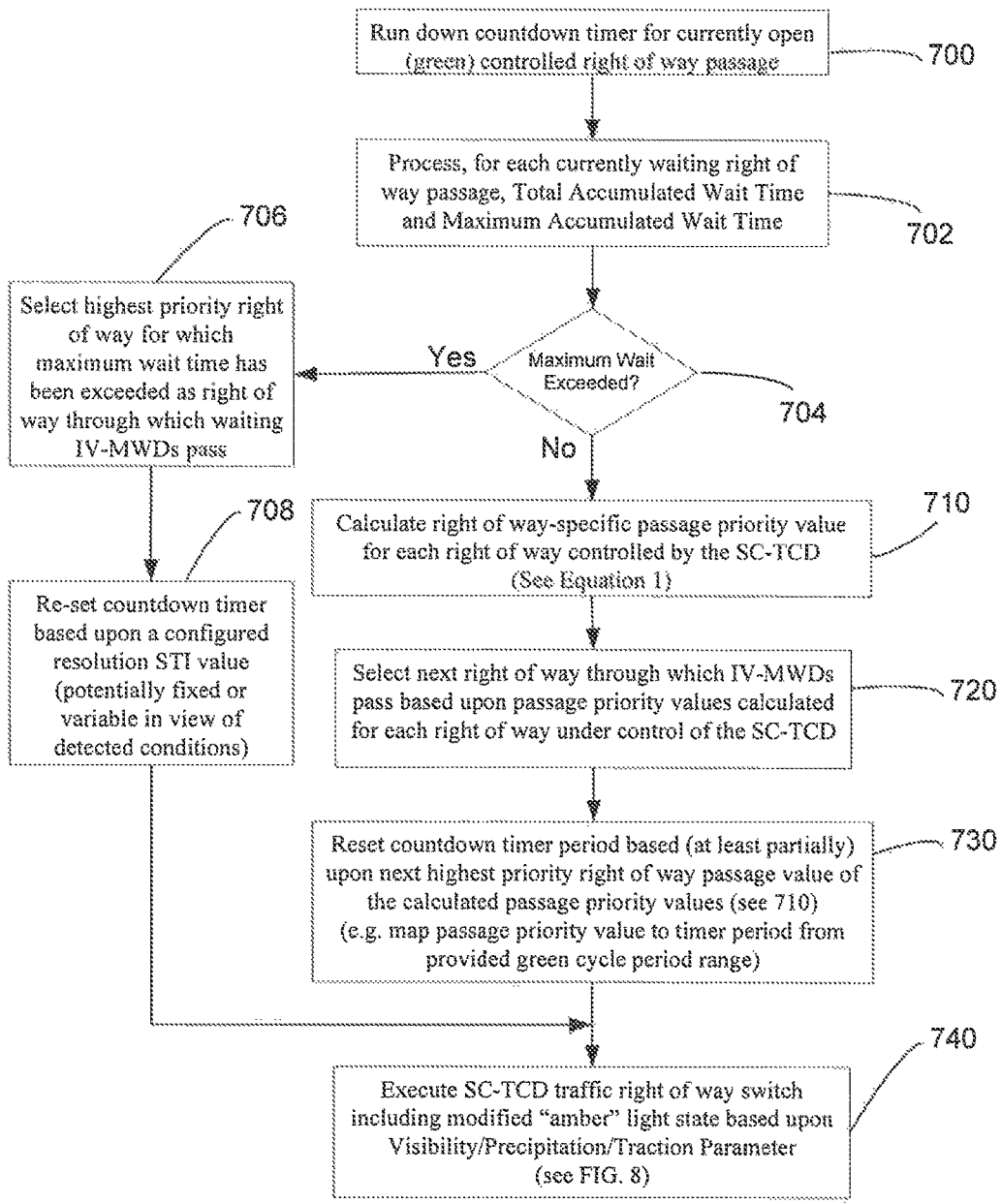
FIG. 7 is a flowchart summarizing a traffic control cycle for determining and providing active right of way passage to a selected one of multiple right of way passages controlled by the SC-TCD.

Having described exemplary architectural and structural aspects of illustrative example, attention is directed to FIGS. 5-7 that summarize operation of the various components depicted in FIG. 1 to render the STI decisions/calculations for the SC-TCD 100 in accordance with illustrative examples. However, before describing a particular example, the overall functionality and guiding principles for illustrative examples are described.

The illustrative examples of operating IV-MWDs and SC-TCDs to render CPs and process the CPs to sets of STIs for various SC-TCDs described herein leverage a wide variety of in-vehicle smart phone functionality enabling determining, through geospatial location services (e.g. Global Positioning System—GPS) and navigation/mapping services, a wide variety of travel information. Such information includes: current location, current location-to-destination distance, number of intervening traffic interruptions (stop signs and traffic control devices—stop lights), weather conditions/alerts, traffic conditions/alerts, and estimated time of arrival at the destination via a specified route. The determined travel information (including travel information not specifically depicted in FIG. 3) is forwarded on an individual IV-MWD basis in the form of commuter profiles (CPs) described, by way of example, hereinabove with reference to FIG. 3. The CPs are issued by IV-MWDs, such as IV-MWD 102, to in-range SC-TCDs for local and/or global processing in accordance with a CP registration operation such as the one summarized in FIG. 5A to create a CP entry on the CP list corresponding to the right of way within which the IV-MWD approaches the intersection. Correspondingly, when an IV-MWD, such as the IV-MWD 102 passes through an intersection governed by a particular SC-TCD containing a CP entry corresponding to the passing IV-MWD 102, the created CP entry in the particular SC-TCD is removed from the CP list of the CP lists 410 in accordance with a CP entry clearing operation such as the one summarized in FIG. 5B.

Turning to FIG. 5A, a flowchart summarizes operation of the IV-MWD 102 to render and issue a CP (see FIG. 3) for a current state of a trip. During 500 the IV-MWD, having previously registered a current trip including a specified destination and route to destination passing through at least one SC-TCD, detects a beacon signal while approaching a SC-TCD. Detecting such approach can occur in any of a variety of ways including using knowledge of an intended route to the specified destination and proximity of the IV-MWD to SC-TCDs determined from the GPS positioning information of the IV-MWD and the SC-TCD through an LPPe capabilities exchange of position information. Thereafter, during 510 the IV-MWD interacts with the SC-TCD to transfer related CP information to the SC-TCD relevant to the SC-TCD calculating an switching time interval. In particular, the IV-MWD provides an SSTI value that is thereafter used by the SC-TCD to calculate an STI (wait time) for a set of IV-MWDs currently waiting to pass a traffic control point associated with the SC-TCD via a same controlled right of way. During 510, the IV-MWD may provide detailed information to ensure the corresponding CP information is accurately associated with a particular right of way list maintained by the SC-TCD. For example, the IV-MWD may indicate approach to a left-turn lane instead of a direct passage through an intersection under control of the SC-TCD. If the approaching IV-MWD does not have an SSTI for the particular SC-TCD, then a default SSTI (e.g. a lowest priority SSTI) is provided by the SC-TCD for the detected approaching IV-MWD.

Turning to FIG. 5B, a flowchart summarizes operation of the IV-MWD 102 to cancel a previously issued CP registered with a particular SC-TCD (per FIG. 5A). During 520, the IV-MWD detects that it is no longer approaching the traffic control point managed by the SC-TCD (or has entered a different controlled right of way passage—such as moving into the left-turn lane). In response, during 530 the IV-MWD cooperatively interacts with the SC-TCD to remove the previously registered CP information associated with the IV-MWD.

Turning to FIG. 6, a flowchart summarizes exemplary operation of the SC-TCD with regard to obtaining and processing CP information for an approaching IV-MWD.

During 600 the SC-TCD receives a probe message via LPPe protocol messaging. During 610, if the CP information is from a new IV-MWD (or possibly a previously registered IV-MWD that has moved to a different right of way from the one previously registered), then control passes to 620 where the SC-TCD issues an LPPe capabilities request message to the approaching IV-MWD to initiate obtaining CP information from the approaching IV-MWD. Thereafter, during 630 the SC-TCD receives an LPPe capabilities response message including a new CP information set containing, for the approaching IV-MWD, profile information (e.g., subscribed STI, trip origination, trip destination, etc.) associated with a current trip of the IV-MWD. During 640 the SC-TCD stores the new CP in a repository of CPs for registered IV-MWDs. In the exemplary system, the SC-TCD maintains a distinct CP list of approaching/waiting IV-MWDs for each controlled right of way at an intersection controlled by the SC-TCD. Additionally, in an exemplary embodiment where SC-TCDs coordinate operation, during 650 the SC-TCD forwards the received CP information to a next SC-TCD along a projected route of the IV-MWD to a specified destination. Such communications may be used to add an additional layer of control to potentially modify a current set of SSTI's for a particular IV-MWD to compensate for excessive delays encountered during earlier portions of a particular trip. In a particular example, the SC-TCD propagates the new CP for the registered IV-MWD to an in-range neighboring SC-TCD (if present) within eNodeB cell X2 interface range along a projected route of the registered IV-MWD. Control then passes to the End.

Alternatively, if during 610, the CP is determined to not be new (i.e., the SC-TCD has at least one CP list entry corresponding to the IV-MWD), then control passes to 660. During 620, if the IV-MWD has been determined to have changed to a different right of way controlled by the SC-TCD, then control passes to 670 to remove the previous CP, which is no longer valid, and control passes to step 620 complete a process for storing a new CP list entry corresponding to the new right of way at which the IV-MWD is now approaching the SC-TCD. Otherwise control passes from 660 to the end.

Turning to FIG. 7 a set of operations are summarized for controlling various right of way approaches in accordance with a set of passage priority values determined for individual ones of the right of way approaches. During 700, the SC-TCD counts down a right of way countdown timer. The countdown timer is associated with, for example, a green light status currently assigned to a selected one of the multiple right of way passages controlled by the SC-TCD. In an exemplary embodiment, the countdown timer is initially assigned a countdown value based upon a lowest computed passage priority value of a set of waiting right of way passages.

During 702, the SC-TCD processes the total accumulated wait time 430 and maximum accumulated wait time values for each of the currently waiting (red light status) right of way passages. Thereafter, during 704, if none of the maximum accumulated wait time values has been exceeded by the corresponding/respective total accumulated wait time values, then control passes to 710.

During 710, the SC-TCD executes a Switching Time Procedure (STP), incorporating a Commuting Experience Enhancement Formula/Algorithm, to render updated passage priorities for each of the right of way passages—including even the right of way passage that currently has green light status. Thus, it is possible for multiple green light sequences in a row for a high priority group of waiting IV-MWDs. In an illustrative example, passage priority values are calculated by the STP for each of the right of way passages in accordance with Equations (1) and (2).

$$\text{Passage Priority} = \frac{[(SSTI(1) + SSTI(2) + \ldots + SSTI(n))]/n}{[(WF(1) + WF(2) + \ldots + WF(n))]} \quad \text{Eqn. (1)}$$

$$WF(i) = \frac{\text{Estimated Trip Time}(i)}{\text{Shortest Detected Trip Time}} \quad \text{Eqn. (2)}$$

In the above example formula for computing passage priority for a particular one of multiple controlled right of way passages by the SC-TCD, the passage priority value calculated for each right of way passage is based upon the CP information provided by "n" IV-MWDs represented within the right of way passage-specific CP list maintained by the SC-TCD, for a particular right of way passage. Thus, the numerator in Equation (1) comprises a sum of the SSTI's of the "n" current IV-MWDs that have not yet passed through the controlled point of passage (e.g. intersections) of the SC-TCD (e.g. traffic light). The SSTI sum in the numerator is divided by "n" to render an average SSTI.

The denominator of the Equation (1) is used to reduce/increase the passage priority calculation based upon a summation of weight factors (WFs) computed for the "n" current IV-MWDs. In the illustrative example, in accordance with Equation (2), the WF for each of the "n" IV-MWDs in the CP list for a right of way passage is a ratio of an IV-MWD's estimated total trip time and the shortest detected trip time (see FIG. 4 element 460) for an IV-MWD currently at the SC-TCD. Thus, a passage priority tends to increase as the IV-MWDs report relatively long estimated trip lengths. In an illustrative embodiment, the WF is capped at a maximum value (e.g. 10). In other instances, the initial ratio value is mapped to a value between 1 and 10.

Thus, in the particular example described above, a highest priority corresponds to a lowest calculated passage priority value. In other illustrative examples, the passage priority is a formula where a highest priority corresponds to a greatest calculated passage priority value.

During 720, the SC-TCD applies the currently calculated set of passage priority values (one per right of way) to determine a next right of way through which IV-MWDs will be permitted to pass. In an exemplary embodiment, the right of way corresponding to the smallest passage priority value is selected to be the next selected right of way.

During 730 the countdown timer is reset for the next designated right of way passage period, for which the winning right of way is allowed to have waiting IV-MWDs pass. In the illustrative example, the time period assigned to the reset countdown timer is based upon the passage priority value calculated for the next highest priority right of way (i.e. the right of way passage having the second smallest calculated passage priority value calculated during 710). More particularly, the SC-TCD uses a mapping function (see passage priority mapping definition 470) to map the passage priority value (of the next priority right of way passage) to a value in a specified range of green light times. Thus, a relatively low value for the passage priority would map to a shortest green light period (i.e., the waiting vehicles have a relatively high priority and therefore will not wait as long). On the other hand, if the passage priority is relatively high, the waiting vehicles are expected to wait for a longer duration, and therefore the green light period is extended for the vehicles in the green light cycle. In yet another example, a ratio between the two highest priority passage priorities is used to specify the green light duration. In yet a further example, the difference between the two highest priority passage priorities is used to select a green light duration. In general, the greater the gap between the highest and next highest priorities, the greater the green light duration for the highest priority right of way passage.

During 740 the SC-TCD executes the traffic control right of way switch in accordance with the right of way selected during 720. An amber (yellow light) period interposed during a green-red light transition is potentially varied (i.e. extended) based upon current visibility and traction conditions currently experienced in the vicinity of the SC-TCD. An example of a procedure for varying the amber period is described below with reference to FIG. 8. At the end of the amber period, a next wait period corresponding to the STI time assigned to the countdown timer commences and control returns to 700.

Returning to 704, if at least one of the maximum accumulated wait time values has been exceeded by the corresponding/respective total accumulated wait time values, then control passes to 706. During 706 the SC-TCD selects a highest priority right of way passage that has a total accumulated wait time exceeding a corresponding maximum accumulated wait time. For example, if two right of way passages have exceeded their respective configured maximum accumulated wait time, then the right of way passage having the lowest STI (new) value is given the higher priority. Alternatively, the highest priority is assigned to the right of way passage having the largest total accumulated wait time. Thereafter, during 708, the SC-TCD re-sets the countdown timer (for green light duration) based upon a value provided by the resolution STI value(s) 450. Control then passes to 740.

Figure 8:
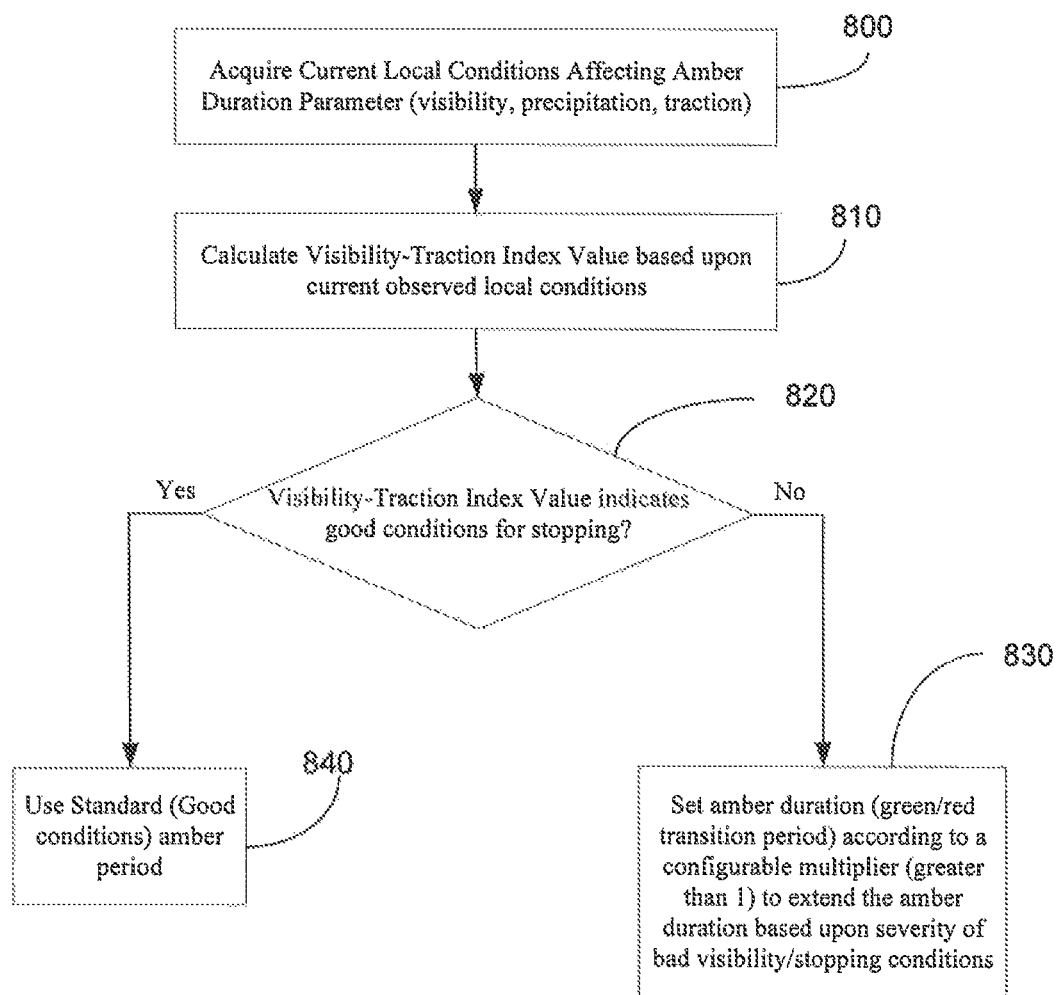
FIG. 8 is a flowchart summarizing an operation performed by the SC-TCD to responsively adjust "amber" period duration, based upon current local visibility and traction conditions, as the SC-TCD transitions a currently selected right of way passage from green to red state.

Turning to FIG. 8, an exemplary set of operations are summarized for reactively adjusting an amber period interposed between green and red states of a right of way. It is contemplated that the operations described herein are driven by a variety of current condition data acquired by the SC-TCD 100 via on-board sensors (e.g. a camera, microphone, traffic speed radar, thermometer, etc.) and external sources (e.g. commercial weather reports) processed by the SC-TCD to render a local Visibility-Traction Index Value. Based upon the Visibility-Traction Index Value, the SC-TCD 100 adjusts the amber period duration. The process summarized in FIG. 8 is intended to be highly responsive to current conditions to adjust, if necessary, the amber period within a matter of seconds after sensing a condition change requiring extension of the amber period from a default value (normal condition state).

With specific reference to FIG. 8, during 800 the SC-TCD 100 acquires current local condition data bearing upon the visibility-traction index value. Examples of potentially used information include road surface conditions (ice, puddling water, snow, etc.) and visibility (e.g., is visibility less than a mile?). Even sounds or image recognition may be used (e.g. detect sliding tire sound, tractor trailer truck break sounds, of image of a truck detected to be arriving at an unsafe speed to the intersection, etc.). During 810, the SC-TCD 100 applies a formula/criterion to the currently sensed conditions to render a current value of the visibility-traction index. By way of example, the index value is calculated shortly before each amber light transition period commences (e.g. a few seconds). By way of example, the visibility-traction index can be a continuous numerical value. Alternatively, the visibility-traction index is characterized by a set of discrete states (e.g., good, fair, poor) where a logical test is applied to current conditions to select one of the discrete states of the visibility-traction index. For example, a clear day with dry road surface is a good state, a wet surface on a clear day may be fair, and raining/foggy conditions are a poor state.

During 820 the visibility-traction index value is applied to a criterion for either using a default amber period or a calculated extended period. Thus, during 820, if the visibility-traction index value indicates good stopping conditions are not present, then control passes to 830. During 830, the SC-TCD sets the amber duration (green/red transition period) according to a configurable relationship between the computed visibility-traction index and a duration multiplier (greater than 1) that expands the default amber period (e.g. 5 seconds) to accommodate the current poor stopping conditions. Otherwise, if the visibility-traction index indicates good stopping conditions, then control passes from 820 to 840. In such case, the standard amber period is used to set the amber duration period when a light transitions from green to red.

In general, in operation the SC-TCD acquires and combines information for multiple received CPs to render a current set of STIs, where a distinct STI is generated for each right of way passage individually controlled by the SC-TCD (e.g. through rights of way, left turn lanes, etc.) for a particular traffic control point. The SC-TCD continuously monitors, via information provided in received CPs, the current status of individual IV-MWDs of program participants, as well as the overall status of IV-MWD groups waiting at particular controlled rights of way. The actual location information, read from the current IV-MWD location 360 for a particular IV-MWD, provides a record of an actual trip.

Another aspect of the system described herein is the accumulation of information provided by individual SC-TCDs to the location server 110 that serves as an accumulator of trip and SC-TCD statistics. For example, upon reaching a previously specified destination the IV-MWD 102 may provide final destination location (via currently sensed GPS coordinates provided in a message from the IV-MWD 102 to SC-TCDs associated with intersections through which the IV-MWD 102 passed during the course of the completed trip. In response, the location server 110 compares the final destination and route to the destination with a proposed trip route at commencement of the trip to validate authenticity of the trip origination location and destination location provided by a program participant using the IV-MWD 102 and stored in the CP structure corresponding to a current trip. The location server 110 may determine that a participant has provided invalid information to achieve an advantage (e.g. relatively smaller SSTIs) and an appropriate penalty is assessed. For example, a fine may be assessed against the registered owner of the IV-MWD or the owner's account may be excluded from participation in the program. Additionally, the LPPe is used to provide further trip progress information useful to update the SSTI, at the location server 110. For example, the location server 110 may determine that the IV-MWD has experienced excessive delays (well beyond the "contracted" SSTIs originally assigned to the particular identified IV-MWD) and provides, in response, an updated SSTI definition for use during the remainder of the trip route in an effort to ensure the trip experience is a close a possible to the "contracted" experience at the commencement of the trip. This update is based on look-ahead traffic pattern feedback to the macro cell from SCTLs along the identified IV-MWD's trip route. Moreover, the location server 110 may use broad management capabilities to maximize traffic flow volume so as to avoid an actual/foreseeable dangerous road condition (e.g. bad weather approaching, police activity, etc.).

The switching time procedure (STP) operating within the SC-TCD applies weight factors to the combined CP information received from potentially many IV-MWDs currently approaching an intersection served by the SC-TCD to render a set of switching time intervals (STIs)—e.g. STI (new) formula in Equation (1). Re-determining STI sets at particular SC-TCDs based upon the above-identified CP information, which includes information provided in received CPs of currently approaching IV-MWDs, improves overall driving experience of a population of drivers by responding to short-term variations in commuter profiles associated with approaching vehicle populations—both at individual SC-TCDs and at multiple SC-TCDs within a region for which STIs are specified on a coordinated basis to enhance overall driver satisfaction.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing control of multiple right of way passages at an intersection, by a traffic control device including a wireless communication interface for communicating with an in-vehicle mobile wireless device (IV-MWD) to receive a commuter profile (CP containing a subscribed switch time interval (SSTI) and a storage for maintaining right of way passage-specific CP sets, the method comprising:
   determining a set of passage priority values for respective ones of each of a set of controlled right of way passages at the intersection, where each one of the set of passage priority values is based upon SSTI values for IV-MWDs currently waiting to pass through a same respective one of the set of controlled right of way passages at the intersection;
   selecting, based upon the set of passage priority values, a highest priority one of the set of controlled right of way passages at the intersection as a next controlled right of way passage granted passage through the intersection;
   resetting a timer duration value associated with a next controlled right of way passage period;
   executing a right of way passage switch in accordance with the selecting; and
   maintaining, after the executing, a current switch status of the traffic control device at the intersection for a period corresponding to the tinier duration value,
   wherein a particular SSTI value for a particular IV-MWD comprises at least a value indicative of a relative wait priority for the particular IV-MWD in relation to other IV-MWDs approaching the intersection and providing SSTI values.

2. The method of claim 1 further comprising:
   acquiring from approaching IV-MWDs, by the traffic control device via localized wireless communications with approaching IV-MWDs, commuter profile (CP) information including the SSTI information.

3. The method of claim 2 further comprising propagating the CP information from a particular IV-MWD to a neighboring traffic control device along a projected route to a destination specified in the CP for the particular IV-MWD.

4. The method of claim 1 further comprising:
   detecting an excessive wait time for one of the set of controlled right of way passages; and
   by-passing, in response to the detecting, the selecting based upon the set of passage priority values, the highest priority one of the set of controlled right of way passages.

5. The method of claim 1 wherein the timer duration value is based, in part, upon estimated trip duration values for IV-MWDs associated with controlled right of way passages that are not granted passage during the period corresponding to the timer duration value.

6. The method of claim 1 wherein each of the passage priority values is based, in part, upon SSTI values for IV-MWDs associated with the corresponding one of the set of controlled right of way passages.

7. The method of claim 1 wherein the timer duration value is based, in part, upon estimated trip duration values for IV-MWDs associated with controlled right of way passages that are not granted passage during the period corresponding to the timer duration value.

8. The method of claim 1 wherein the executing is performed in accordance with a duration of a switching time for transitioning from a current right of way passage to the selected one of the controlled right of way passages, wherein the duration is determined in accordance with a driving conditions parameter.

9. The method of claim 1 further comprising:
   detecting passage of a particular IV-MWD through an intersection under control of the traffic control device; and removing, in response to the detecting, a commuter profile corresponding to the particular IV-MWD from a corresponding one of the right of way passage-specific CP sets.

10. A non-transitory computer-readable medium including computer executable instructions facilitating managing control of multiple right of way passages at an intersection, by a traffic control device including a wireless communication interface for communicating with an in-vehicle mobile wireless device (IV-MWD) to receive a commuter profile (CP) containing a subscribed switch time interval (SSTI) and a storage for maintaining right of way passage-specific CP sets, the computer-executable instructions, when facilitating performing a method comprising:

determining a set of passage priority values for respective ones of each of a set of controlled right of way passages at the intersection, where each one of the set of passage priority values is based upon SSTI values for IV-MWDs currently waiting to pass through a same respective one of the set of controlled right of way passages at the intersection;

selecting, based upon the set of passage priority values, a highest priority one of the set of controlled right of way passages at the intersection as a next controlled right of way passage granted passage through the intersection;

resetting a timer duration value associated with a next controlled right of way passage period;

executing a right of way passage switch in accordance with the selecting; and maintaining, after the executing, a current switch status of the traffic control device at the intersection for a period corresponding to the timer duration value, wherein a particular SSTI value for a particular IV-MWD comprises at least a value indicative of a relative wait priority for the particular IV-MWD in relation to other IV-MWDs approaching the intersection and providing SSTI values.

11. The non-transitory computer-readable medium of claim 10 wherein the computer-executable instructions facilitate performing the method further comprising:

acquiring from approaching IV-MWDs, by the traffic control device via localized wireless communications with approaching IV-MWDs, commuter profile (CP) information including the SSTI information.

12. The non-transitory computer-readable medium of claim 11 wherein the computer-executable instructions facilitate performing the method further comprising:

propagating the CP information from a particular IV-MWD to a neighboring traffic control device along a projected route to a destination specified in the CP for the particular IV-MWD.

13. The non-transitory computer-readable medium of claim 10 wherein the computer-executable instructions facilitate performing the method further comprising:

detecting an excessive wait time for one of the set of controlled right of way passages; and by-passing, in response to the detecting, the selecting based upon the set of passage priority values, the highest priority one of the set of controlled right of way passages.

14. The non-transitory computer-readable medium of claim 10 wherein the timer duration value is based, in part, upon estimated trip duration values for IV-MWDs associated with controlled right of way passages that are not granted passage during the period corresponding to the timer duration value.

15. The non-transitory computer-readable medium of claim 10 wherein each of the passage priority values is based, in part, upon SSTI values for IV-MWDs associated with the corresponding one of the set of controlled right of way passages.

16. The non-transitory computer-readable medium of claim 10 wherein the timer duration value is based, in part, upon estimated trip duration values for IV-MWDs associated with controlled right of way passages that are not granted passage during the period corresponding to the timer duration value.

17. The non-transitory computer-readable medium of claim 10 wherein the executing is performed in accordance with a duration of a switching time for transitioning from a current right of way passage to the selected one of the controlled right of way passages, wherein the duration is determined in accordance with a driving conditions parameter.

18. The non-transitory computer-readable medium of claim 10 wherein the computer-executable instructions facilitate performing the method further comprising:

detecting passage of a particular IV-MWD through an intersection under control of the traffic control device; and removing, in response to the detecting, a commuter profile corresponding to the particular IV-MWD from a corresponding one of the right of way passage-specific CP sets.

19. A traffic control device (TCD) node for managing control of multiple right of way passages at an intersection, the TCD node comprising:

a mobile wireless interface for communicating with an in-vehicle mobile wireless device (IV-MWD) to receive a commuter profile (CP) containing a subscribed switch time interval (SSTI);

a processor; and a non-transitory computer-readable medium configured to store right of way passage-specific CP sets and to store computer-executable instructions that, when executed by the processor, facilitate performing, by the TCD, a method comprising:

determining a set of passage priority values for respective ones of each of a set of controlled right of way passages at the intersection, where each one of the set of passage priority values is based upon SSTI values for IV-MWDs currently waiting to pass through a same respective one of the set of controlled right of way passages at the intersection;

selecting, based upon the set of passage priority values, a highest priority one of the set of controlled right of way passages at the intersection as a next controlled right of way passage granted passage through the intersection;

resetting a timer duration value associated with a next controlled right of way passage period;

executing a right of way passage switch in accordance with the selecting; and maintaining, after the executing, a current switch status of the traffic control device at the intersection for a period corresponding to the timer duration value, wherein a particular SSTI value for a particular IV-MWD comprises at least a value indicative of a relative wait priority for the particular IV-MWD in relation to other IV-MWDs approaching the intersection and providing SSTI values.

20. The TCD of claim 19 wherein the computer-executable instructions facilitate performing the method further comprising:

acquiring from approaching IV-MWDs, by the traffic control device via localized wireless communications with approaching IV-MWDs, commuter profile (CP) information including the SSTI information.

21. The TCD of claim 20 wherein the computer-executable instructions facilitate performing the method further comprising:
propagating the CP information from a particular IV-MWD to a neighboring traffic control device along a projected route to a destination specified in the CP for the particular IV-MWD.

22. The TCD of claim 19 wherein the computer-executable instructions facilitate performing the method further comprising:
detecting an excessive wait time for one of the set of controlled right of way passages; and
by-passing, in response to the detecting, the selecting based upon the set of passage priority values, the highest priority one of the set of controlled right of way passages.

23. The TCD of claim 19 wherein the timer duration value is based, in part, upon estimated trip duration values for IV-MWDs associated with controlled right of way passages that are not granted passage during the period corresponding to the timer duration value.

24. The TCD of claim 19 wherein each of the passage priority values is based, in part, upon SSTI values for IV-MWDs associated with the corresponding one of the set of controlled right of way passages.

25. The TCD of claim 19 wherein the timer duration value is based, in part, upon estimated trip duration values for IV-MWDs associated with controlled right of way passages that are not granted passage during the period corresponding to the timer duration value.

26. The TCD of claim 19 wherein the executing is performed in accordance with a duration of a switching time for transitioning from a current right of way passage to the selected one of the controlled right of way passages, wherein the duration is determined in accordance with a driving conditions parameter.

27. The TCD of claim 19 wherein the computer-executable instructions facilitate performing the method further comprising:
detecting passage of a particular IV-MWD through an intersection under control of the traffic control device; and
removing, in response to the detecting, a commuter profile corresponding to the particular IV-MWD from a corresponding one of the right of way passage-specific CP sets.

* * * * *